United States Patent
Kim et al.

(10) Patent No.: US 12,538,207 B2
(45) Date of Patent: Jan. 27, 2026

(54) ELECTRONIC DEVICE, NETWORK SYSTEM, AND CONTROL METHOD THEREOF

(71) Applicant: SAMSUNG ELECTRONICS CO., LTD., Suwon-si (KR)

(72) Inventors: Junhyung Kim, Suwon-si (KR); Taewon Ahn, Suwon-si (KR); Dongkeon Kong, Suwon-si (KR); Hyejung Cho, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 362 days.

(21) Appl. No.: 18/080,699

(22) Filed: Dec. 13, 2022

(65) Prior Publication Data

US 2023/0111313 A1    Apr. 13, 2023

Related U.S. Application Data

(63) Continuation of application No. PCT/KR2021/007698, filed on Jun. 18, 2021.

(30) Foreign Application Priority Data

Jul. 17, 2020 (KR) .................. 10-2020-0089116
Oct. 29, 2020 (KR) .................. 10-2020-0142304

(51) Int. Cl.
*H04W 40/24* (2009.01)
*H04L 41/12* (2022.01)
(Continued)

(52) U.S. Cl.
CPC ........... *H04W 40/244* (2013.01); *H04L 41/12* (2013.01); *H04L 45/20* (2013.01); *H04W 84/18* (2013.01)

(58) Field of Classification Search
CPC .... H04W 40/244; H04W 84/18; H04L 41/12; H04L 45/20
See application file for complete search history.

(56) References Cited

U.S. PATENT DOCUMENTS 7,924,831 B2   4/2011   Seok
8,175,796 B1 *  5/2012   Blackburn ............. G08G 1/161
                                                340/902
(Continued)

FOREIGN PATENT DOCUMENTS

CN    101816201 A  *  8/2010  ............ H04W 12/08
CN    103582118 B  *  8/2016
(Continued)

OTHER PUBLICATIONS

International Search Report and Written Opinion for International Application No. PCT/KR2021/007698; International Filing Date Jun. 18, 2021; Date of Mailing Sep. 17, 2021; 49 Pages.

*Primary Examiner* — Shean Tokuta
(74) *Attorney, Agent, or Firm* — CANTOR COLBURN LLP

(57) ABSTRACT

Disclosed are electronic device, a network system, and a control method thereof. An electronic device according to the present disclosure comprises a memory, a communication interface, and a processor which: when receiving network connection information including a hop count from a first external device connected to a network, updates the network connection information to reduce the hop count, and stores the same in the memory; and when receiving a beacon message from a second external device that is not connected to the network, transmits the updated network connection information to the second external device by using the communication interface so that the second external device can be connected to the network.

14 Claims, 19 Drawing Sheets

(51) Int. Cl.
*H04L 45/00* (2022.01)
*H04W 84/18* (2009.01)

(56) References Cited

U.S. PATENT DOCUMENTS

| | | | |
|---|---|---|---|
| 8,411,684 B1* | 4/2013 | Das | H04L 63/20 |
| | | | 370/254 |
| 9,055,105 B2 | 6/2015 | Leppanen et al. | |
| 9,578,722 B2 | 2/2017 | Feng et al. | |
| 9,832,845 B2 | 11/2017 | Cho | |
| 10,397,850 B2 | 8/2019 | Kwon et al. | |
| 10,659,919 B1 | 5/2020 | Li et al. | |
| 10,848,945 B2 | 11/2020 | Choi | |
| 10,932,107 B2 | 2/2021 | Bae et al. | |
| 10,993,168 B2* | 4/2021 | Rimhagen | H04W 40/244 |
| 11,765,563 B2* | 9/2023 | Zhou | H04W 48/06 |
| | | | 370/252 |
| 2009/0116410 A1 | 5/2009 | Seok | |
| 2010/0185753 A1 | 7/2010 | Liu et al. | |
| 2010/0268825 A1* | 10/2010 | Jeong | H04W 52/0219 |
| | | | 709/226 |
| 2010/0304759 A1 | 12/2010 | Leppanen et al. | |
| 2011/0134762 A1* | 6/2011 | Chen | H04W 40/32 |
| | | | 370/252 |
| 2011/0223937 A1 | 9/2011 | Leppänen et al. | |
| 2011/0234366 A1 | 9/2011 | Feng et al. | |
| 2013/0182552 A1* | 7/2013 | Hall | H04L 41/0668 |
| | | | 370/216 |
| 2015/0264627 A1* | 9/2015 | Perdomo | H04L 67/04 |
| | | | 370/329 |
| 2016/0323012 A1* | 11/2016 | Kwon | H04B 1/7143 |
| 2017/0118082 A1* | 4/2017 | Narayanan | H04L 41/042 |
| 2017/0142810 A1 | 5/2017 | Cho | |
| 2018/0035374 A1* | 2/2018 | Borden | H04W 28/0278 |
| 2018/0139683 A1* | 5/2018 | Kwon | H04W 40/22 |
| 2018/0206094 A1 | 7/2018 | Choi | |
| 2018/0262872 A1* | 9/2018 | Liu | H04W 4/021 |
| 2019/0200193 A1 | 6/2019 | Bae et al. | |
| 2020/0169861 A1* | 5/2020 | Hu | H04W 4/80 |
| 2022/0103456 A1* | 3/2022 | Cozza | H04W 40/22 |
| 2022/0183084 A1* | 6/2022 | Zhou | H04W 12/55 |
| 2023/0111313 A1* | 4/2023 | Kim | H04L 45/20 |
| | | | 370/254 |

FOREIGN PATENT DOCUMENTS

| | | | | |
|---|---|---|---|---|
| JP | 2012511275 A | | 5/2012 | |
| KR | 20100057828 A | | 6/2010 | |
| KR | 101092763 B1 | | 12/2011 | |
| KR | 101298155 B1 | | 9/2013 | |
| KR | 101417703 B1 | | 7/2014 | |
| KR | 101626881 B1 | | 6/2016 | |
| KR | 20170013606 A | | 2/2017 | |
| KR | 20170058515 A | | 5/2017 | |
| KR | 20180075298 A | | 7/2018 | |
| KR | 20180089660 A | | 8/2018 | |
| KR | 20190075644 A | | 7/2019 | |
| KR | 20190076175 A | | 7/2019 | |
| KR | 20190122898 A | | 10/2019 | |
| KR | 20220010401 A | * | 1/2022 | H04W 40/244 |
| WO | 2007013914 A1 | | 2/2007 | |
| WO | 2015200558 A1 | | 12/2015 | |
| WO | WO-2016130106 A1 | * | 8/2016 | H04W 56/001 |
| WO | 2016153279 A1 | | 9/2016 | |
| WO | 2016175640 A1 | | 11/2016 | |
| WO | 2017222449 A1 | | 12/2017 | |
| WO | WO-2020150349 A1 | * | 7/2020 | H04W 8/005 |
| WO | WO-2022014882 A1 | * | 1/2022 | H04W 40/244 |

* cited by examiner

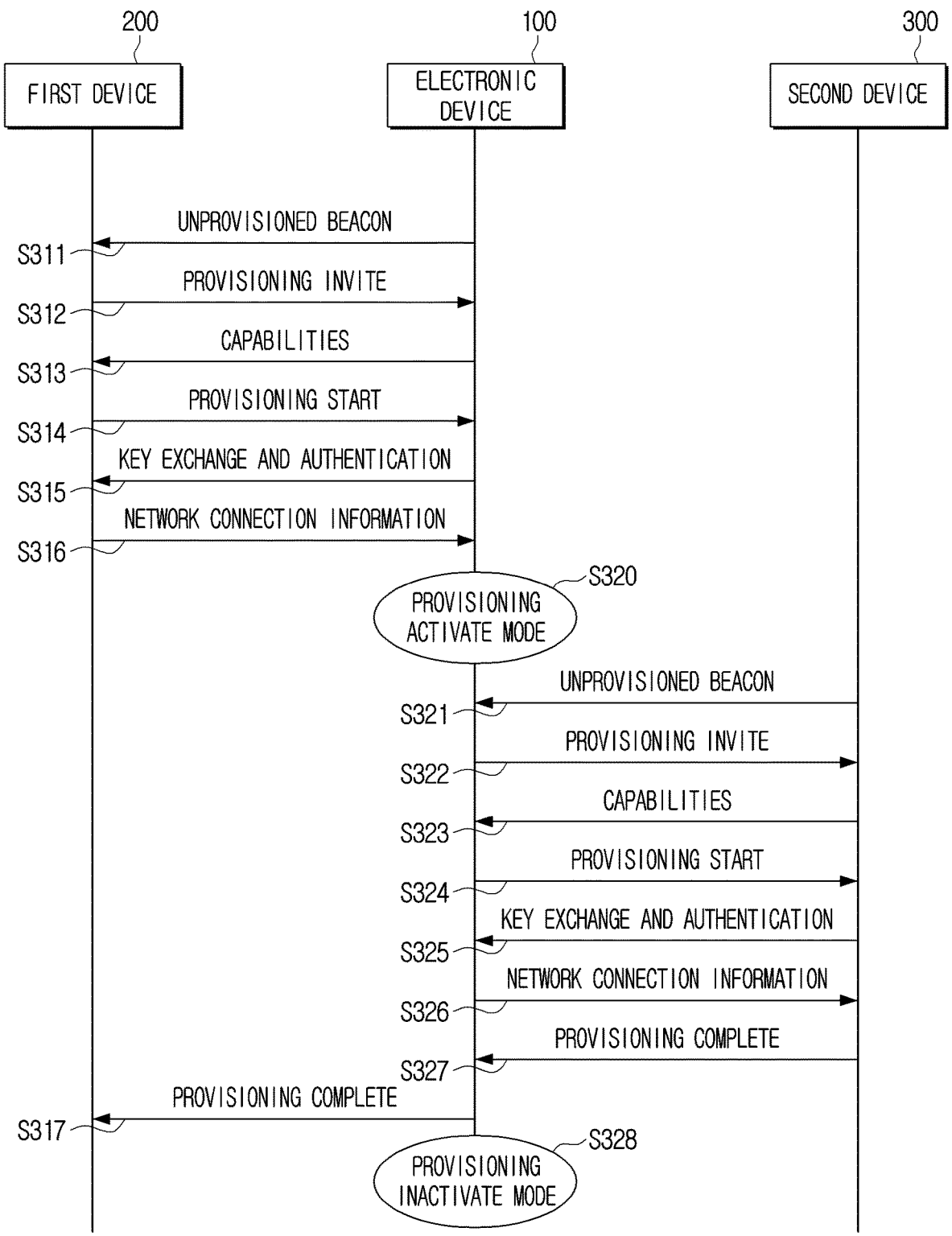

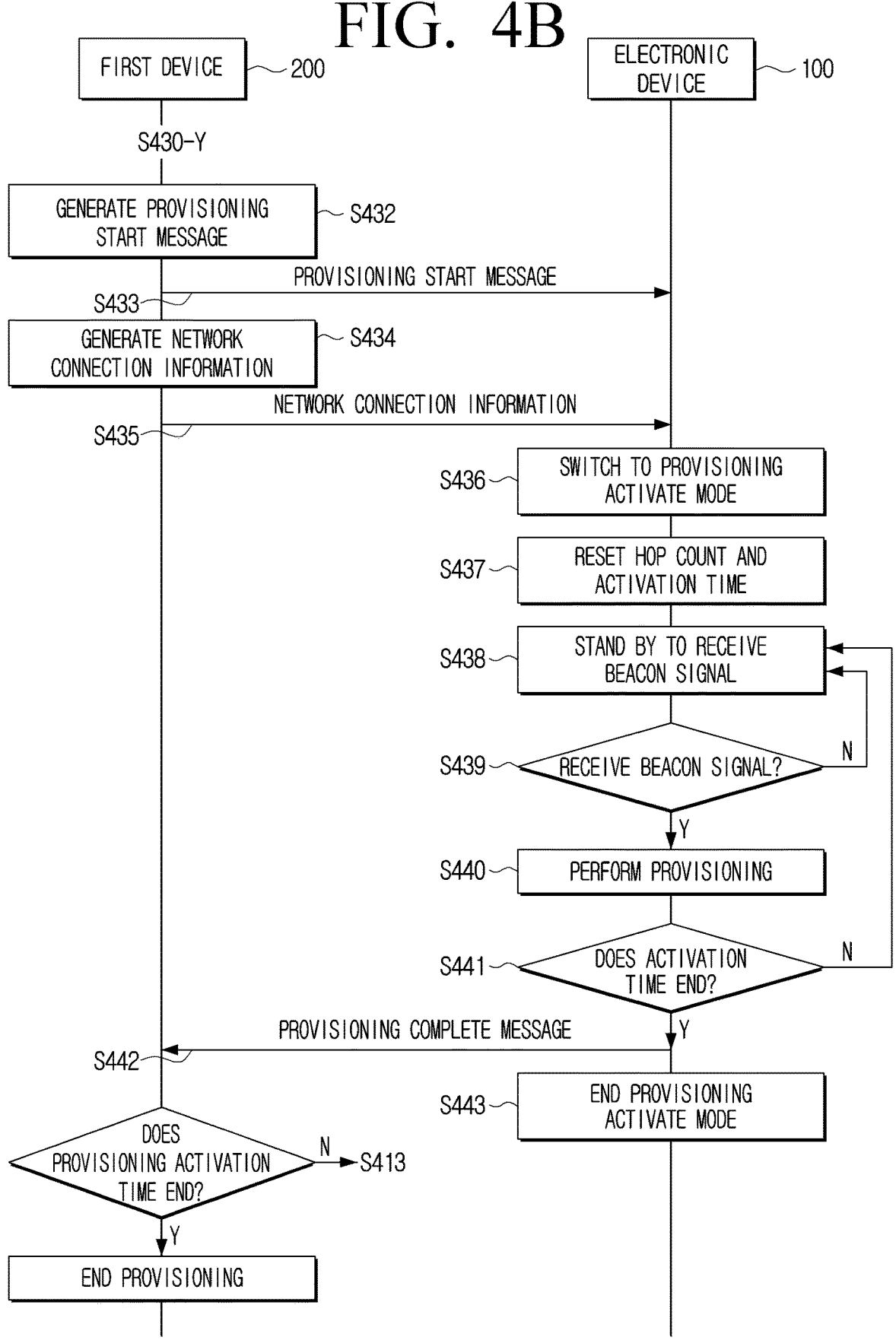

FIG. 6A

| Field | Size (octets) | Value |
|---|---|---|
| Attention Duration (Activation timer) | 1 | 0x00 == 0:Off<br>0x00 == 1:Proactive Provisioning<br>0x02 - 0x0F:Activation timer (second) |

FIG. 6B

| Field | Size (octets) | Value (Bit) |
|---|---|---|
| Algorithms | 2 | 0:FIPS P-258 Elliptic Curve<br>1:Proactive Provisioning Supported<br>2-15:Reserved for Future Use |

FIG. 6C

| Field | Size (octets) | Value (Bit) |
|---|---|---|
| Flags | 1 | 0:Key Refresh Flag<br>1:IV Update Flag<br>2:Proactive Provisioning Flag<br>3-6:Hop count<br>7:Reserved for Future Use |

FIG. 10B

| DEVICE | RSSI |
|--------|------|
| B | 1 |
| C | 2 |
| D | 0.5 |

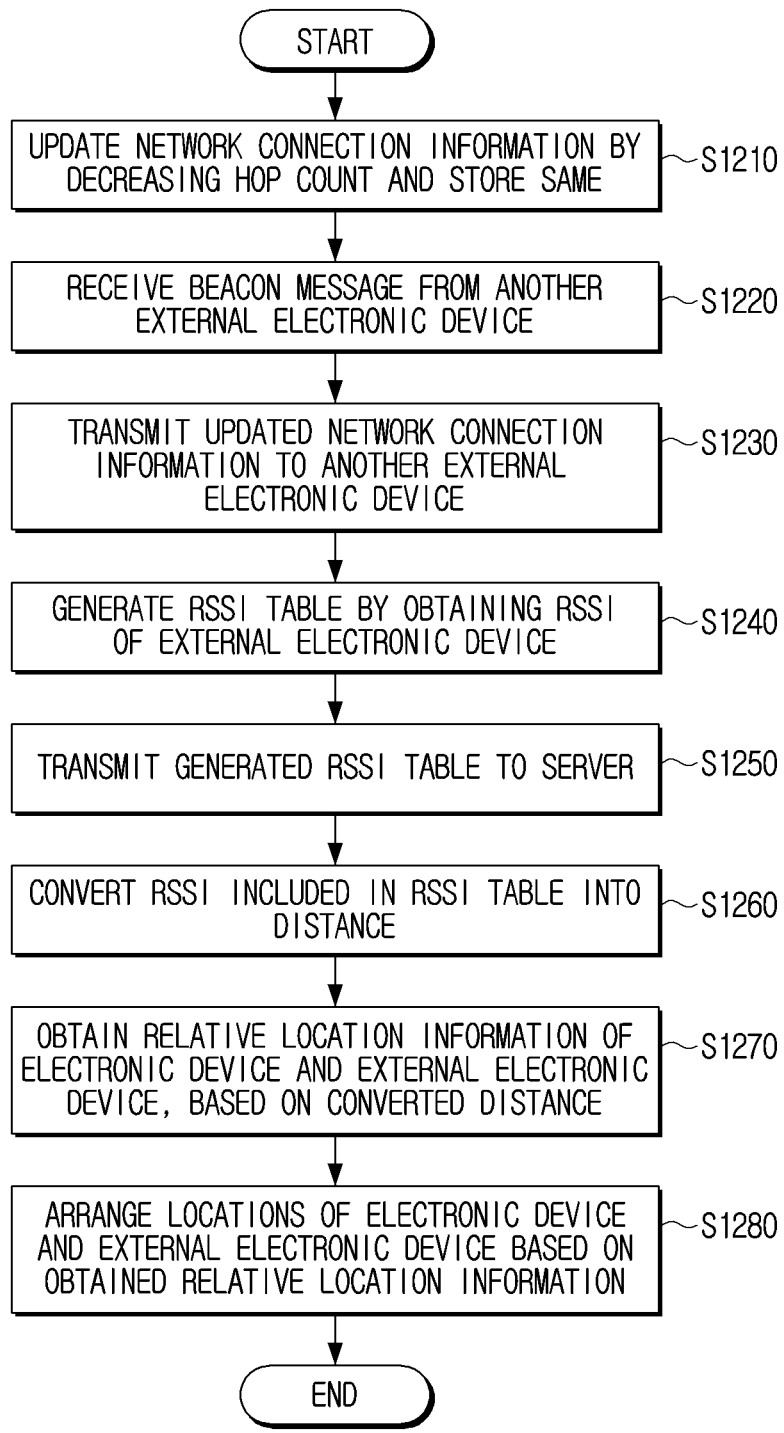

ELECTRONIC DEVICE, NETWORK SYSTEM, AND CONTROL METHOD THEREOF

CROSS-REFERENCE TO RELATED APPLICATION

This application is a continuation of International Application No. PCT/KR2021/007698, designating the United States, filed on June 18, 2021, in the Korean Intellectual Property Receiving Office and claiming priority to Korean Patent Application No. 10-2020-0142304, filed on Oct. 29, 2020, in the Korean Intellectual Property Office and Korean Patent Application No. 10-2020-0089116, filed on Jul. 17, 2020, in the Korean Intellectual Property Office, the disclosures of which are incorporated by reference herein in their entireties.

TECHNICAL FIELD

The present disclosure relates to an electronic device and a control method thereof, and more particularly, to an electronic device that performs mesh network provisioning and facilitates communication between electronic devices and identifies its location in the mesh network, and a control method thereof.

BACKGROUND ART

In recent years, there has been an increasing interest in communication technology using a mesh network. The mesh network refers to a network topology in which each node relays data to a network, and includes multipoint to multipoint wireless networks.

A provisioning operation between devices may be necessary to form the mesh network. Provisioning refers to an operation of connecting a device that is not included in the mesh network to the mesh network so that the device that is not included in the mesh network becomes a node in the mesh network.

Technical Problem

A provisioner refers to a device that performs the provisioning operation of connecting the device that is not included in the mesh network to the mesh network, and a conventional provisioner is required to repeatedly perform the provisioning operation based on the scan range and mesh network range of the provisioner. For example, the range in which the device to be connected to the mesh network may be wider than the scan range of the provisioner, and in this case, the provisioner is required to repeatedly perform the provisioning operation while moving the range to be connected to the mesh network.

There has thus been an increasing need for a method for efficiently performing the provisioning to form the mesh network.

Technical Solution

The present disclosure provides an electronic device that efficiently performs provisioning to form a mesh network and checks its respective location in the formed mesh network, and a control method thereof.

According to an embodiment of the present disclosure, an electronic device includes: a memory; a communication interface; and a processor updating network connection information by decreasing a hop count and storing the same in the memory when receiving the network connection information including the hop count from a first external electronic device connected to a network, and transmitting the updated network connection information to a second external electronic device by using the communication interface to connect the second external electronic device to the network when receiving a beacon message from the second external electronic device indicating that the second external electronic device is not connected to the network.

According to another embodiment of the present disclosure, a network system includes: a plurality of electronic devices; and a server, wherein one electronic device among the plurality of electronic devices updates network connection information by decreasing a hop count and storing the same when receiving the network connection information including the hop count from a first external electronic device connected to a network; transmits the updated network connection information to a second external electronic device to connect the second external electronic device to the network when receiving a beacon message from the second external electronic device indicating that the second external electronic device is not connected to the network; generates a received signal strength indicator (RSSI) table by obtaining an RSSI of at least one external electronic device located within a scan range of the respective electronic device; and transmits the generated RSSI table to the server, and the server converts the RSSI included in the received RSSI table into a distance; obtains relative location information of the electronic device and the first external electronic device based on the converted distance; and arranges locations of the electronic device and the first external electronic device based on the obtained relative location information.

According to still another embodiment of the present disclosure, a control method of an electronic device includes: updating network connection information by decreasing a hop count and storing the same when the network connection information including the hop count is received from a first external electronic device connected to a network; receiving a beacon message from a second external electronic device that is not connected to the network; and transmitting the updated network connection information to the second external electronic device to connect the second external electronic device to the network.

According to yet another embodiment of the present disclosure, a control method of a network system includes: updating network connection information by decreasing a hop count and storing the same when the network connection information including the hop count is received from a first external electronic device connected to a network; receiving a beacon message from a second external electronic device that is not connected to the network; and transmitting the updated network connection information to the second external electronic device to connect the second external electronic device to the network; generating a received signal strength indicator (RSSI) table by obtaining an RSSI of at least one external electronic device located within a scan range of an electronic device; transmitting the generated RSSI table to the server; converting the RSSI included in the received RSSI table into a distance; obtaining relative location information of the electronic device and the first external electronic device based on the converted distance; and arranging locations of the electronic device and the first external electronic device based on the obtained relative location information.

DESCRIPTION OF DRAWINGS

FIGS. 3, 4A and 4B are sequence diagrams for the electronic device that performs provisioning according to another embodiment of the present disclosure.

FIGS. 6A, 6B and 6C are views of a message transmitted and received in a provisioning process according to another embodiment of the present disclosure.

FIG. 10B is a view showing a measurement result of the RSSI according to an embodiment of the present disclosure.

FIG. 12 is a flowchart showing a control method of a system according to yet another embodiment of the present disclosure.

BEST MODE

Figure 1:
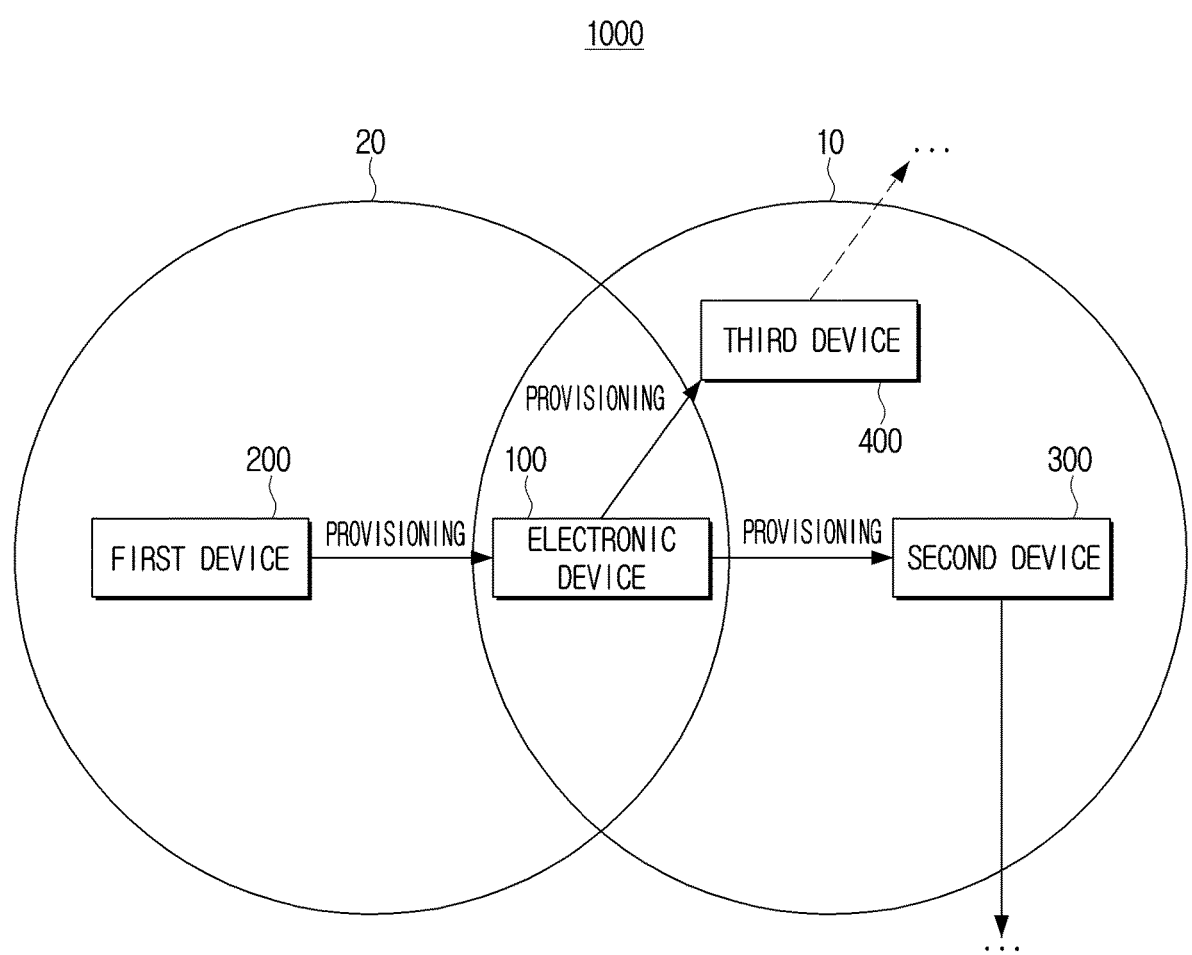
FIG. 1 is a view of a network system according to an embodiment of the present disclosure.

Hereinafter, various embodiments of the present disclosure will be described with reference to the accompanying drawings. However, it is to be understood that technology mentioned in the present disclosure is not limited to specific embodiments, and include all modifications, equivalents and/or alternatives according to the various embodiments of the present disclosure. Throughout the accompanying drawings, similar components are denoted by similar reference numerals.

In the present disclosure, an expression "have," "may have," "include," "may include" or the like, indicates the existence of a corresponding feature (for example, a numerical value, a function, an operation or a component such as a part), and does not exclude the existence of an additional feature.

In the present disclosure, an expression "A or B," "least one of A and/or B," "one or more of A and/or B" or the like, may include all possible combinations of items enumerated together. For example, "A or B," "at least one of A and B" or "at least one of A or B" may indicate all of 1) a case where at least one A is included, 2) a case where at least one B is included or 3) a case where both of at least one A and at least one B are included.

Expressions "first," "second" and the like, used in the present disclosure, may indicate various components regardless of the sequence and/or importance of the components. These expressions are used only to distinguish one component from another component, and do not limit the corresponding component.

In case that any component (for example, a first component) is mentioned to be "(operatively or communicatively) coupled with/to" or "connected to" another component (for example, a second component), it is to be understood that any component is directly coupled to another component or coupled to another component through still another component (for example, a third component). On the other hand, in case that any component (for example, the first component) is mentioned to be "directly coupled to" or "directly connected to" another component (for example, the second component), it is to be understood that still other component (for example, the third component) is not present between any component and another component.

An expression "configured (or set) to" used in the present disclosure may be replaced by an expression "suitable for," "having the capacity to," "designed to," "adapted to," "made to" or "capable of," based on a situation. The expression "configured (or set) to" may not necessarily indicate "specifically designed to" in hardware. Instead, the expression "a device configured to" in any situation may indicate that the device may "perform~" together with another device or component. For example, "a processor configured (or set) to perform A, B and C" may indicate a dedicated processor (for example, an embedded processor) for performing the corresponding operations or a generic-purpose processor (for example, a central processing unit (CPU) or an application processor) that may perform the corresponding operations by executing one or more software programs stored in a memory apparatus.

In the present disclosure, a term "user" may refer to a person using an electronic device or a device (e.g., artificial intelligence electronics) using the electronic device.

FIG. 1 is a view for explaining a network system according to an embodiment of the present disclosure.

As shown in FIG. 1, a network system 1000 may include an electronic device 100, a first device 200, a second device 300, and a third device 400.

The electronic device 100, the first device 200, the second device 300, and the third device 400, according to various embodiments of the present disclosure, may include various devices which may communicate with other devices. For example, the electronic device 100, the first device 200, the second device 300, and the third device 400 may include at least one of a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), a moving picture experts group (MPEG) audio layer 3 (MP3) player, a medical device, a camera, and a wearable device. The wearable device may include at least one of an accessory type (for example, a watch, a ring, a bracelet, an anklet, a necklace, a pair of glasses, a contact lens, a head-mounted-device (HMD), a textile or clothing integral type (for example, an electronic clothing), a body attachment type (for example, a skin pad or a tattoo), or a living body implantation type circuit. In some embodiments, the electronic device 100, the first device 200, the second device 300, and the third device 400 may include, for example, at least one of a lighting device, a television, a digital video disk (DVD) player, an audio player, a refrigerator, an air conditioner, a vacuum cleaner, an oven, a microwave oven, a washing machine, an air purifier, a set-top box, a home automation control panel, a security control panel, a media box (e.g., Samsung HomeSync™, Apple TV™ or Google TV™), a game console (e.g., Xbox™ or PlayStation™), an electronic dictionary, an electronic key, a camcorder or an electronic picture frame.

The first device 200 is an electronic device that performs a provisioning operation, and may be a provisioner that connects an electronic device in a scan range 20 of the first device 200 to a mesh network.

In present disclosure, the "provisioning operation" (or simply, "provisioning") refers to the operation of connecting a device that is not included in the mesh network to the mesh network so that the device that is not included in the mesh network becomes a node in the mesh network, and the "provisioner" refers to an electronic device that performs the provisioning operation. In addition, the scan range of an electronic device refers to a range in which the electronic device may detect a signal transmitted from another device. For example, 10 m may be the scanning range of an electronic device, and in this case, the electronic device may detect a signal from another electronic device, transmitted within a radius of 10 m.

The electronic device 100 is a device belonging to (i.e., located within) the scan range of the first device 200, and the first device 200 may thus receive a beacon message transmitted from the electronic device 100, and, in response, perform the provisioning operation so that the electronic device 100 is connected to the mesh network. Here, the beacon message broadcasted by the electronic device 100 may be a message indicating that the electronic device 100 is a device that is not included in the mesh network, that is, the electronic device 100 is a un-provisioned device.

The first device 200 may identify whether the electronic device 100 is a device which is compatible with the current provisioning operation while performing the provisioning operation with the electronic device 100. Here, the electronic device 100 may be identified to perform the provisioning, and in this case, the first device 200 may transmit, to the first device 200, network connection information including provisioning data and a hop count necessary for the electronic device 100 to perform the provisioning. In the present disclosure, the hop count refers to the number of intermediate devices existing between the first device 200 and any device in the mesh network in connection between the first device 200 and the any device in the mesh network.

Meanwhile, the second device 300 and the third device 400 exist outside the scan range 20 of the first device 200. Therefore, the first device 200 is unable to receive a provisioning-request signal from the second device 300 or the third device 400, and is unable to perform the provisioning operation with the second device 300 or the third device 400.

However, the electronic device 100, after its own provisioning is complete, may perform the provisioning operation and the second device 300 and the third device 400 may exist in a scan range 10 of the electronic device 100. In this case, the electronic device 100 may perform the provisioning operation with the second device 300 and the third device 400 based on the network connection information including the hop count received from the first device 200.

Here, the second device 300 and the third device 400 may be connected to the same mesh network as the first device 200 and the electronic device 100 in that the electronic device 100 is connected to the mesh network through the provisioning performed by the first device 200, and receives the network connection information from the first device 200.

Meanwhile, the electronic device 100 may identify whether the second device 300 or the third device 400 is a device which may perform the provisioning operation, and, if so, the second device 300 or the third device 400 may perform the provisioning. In this case, the electronic device 100 may transmit the network connection information necessary for performing the provisioning to a device which may perform the provisioning. Accordingly, the second device 300 or the third device 400 may also allow a device that is not included in the mesh network to become a node in the mesh network while performing later provisioning operations.

As such, according to the present disclosure, it is possible to increase provisioning efficiency in that the electronic device 100 connected through the provisioning of the first device 200 may perform the provisioning so that the second device 300 and the third device 400 are connected to the mesh network, that is, the first device 200 may allow the second device 300 and the third device 400 to be connected to the mesh network only by performing the provisioning with the electronic device 100.

Figure 2:
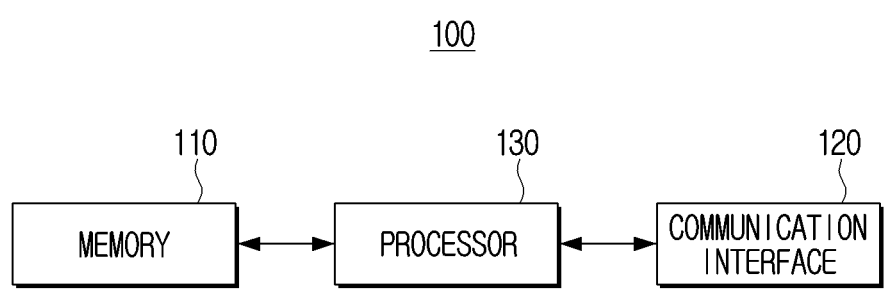
FIG. 2 is a block diagram of a configuration of an electronic device according to another embodiment of the present disclosure.

FIG. 2 is a block diagram for explaining a configuration of an electronic device according to another embodiment of the present disclosure.

As shown in FIG. 2, an electronic device 100 may include a memory 110, a communication interface 120, and a processor 130.

The memory 110 is configured to store an operating system (OS) for controlling overall operations of components included in the electronic device 100 and at least one instruction or data related to the components of the electronic device 100. The instruction refers to one action statement which may be directly executed by the processor 130 in a programming language, and is a minimum unit for executing a program or an operation.

The processor 130 may perform operations according to various embodiments to be described below by executing at least one instruction stored in the memory 110.

The memory 110 is a component for storing various programs and data necessary for the operation of the electronic device 100. The memory 110 may be implemented as a non-volatile memory, a volatile memory, a flash-memory, a hard disk drive (HDD), a solid state drive (SSD), or the like. The memory 110 may be accessed by the processor 130, and readout, recording, correction, deletion, update, and the like, of the data may be performed by the processor 130. In the present disclosure, the term "memory" may include the memory 110, a read only memory (ROM, not shown) or a random access memory (RAM, not shown) in the processor 130, or a memory card (not shown) (for example, a micro secure digital (SD) card or a memory stick) mounted in the electronic device 100.

The memory 110 may store data received from an external device or data to be transmitted to the external device. In detail, the memory 110 may store network connection information including provisioning data and hop count received by the electronic device 100 from the external device connected to a network such as a first device 200. In addition, the memory 110 may update network connection information by decreasing the hop count included in the network connection information received from the first device 200, and store the same.

The communication interface 120 is configured to allow the electronic device 100 to communicate with the external devices such as the first device 200, a second device 300, and a third device 400. The electronic device 100 may receive the network connection information from the first device 200 through the communication interface 120, update the received network connection information, and transmit the received network connection information to the second device 300 or the third device 400.

The communication interface 120 may include various communication modules such as a wired communication module (not shown), a short-range wireless communication module (not shown), a wireless communication module (not shown), and the like.

Here, the wired communication module is a module for performing communication with an external device (not shown) by using a wired communication method such as wired Ethernet. The short-range wireless communication module is a module for performing communication with an external device (not shown) located in a short distance by using a short-range wireless communication method such as a Bluetooth (BT) method, a Bluetooth low energy (BLE) method, a ZigBee method, or the like. The wireless communication module is a module for performing communication with an external device (not shown) by being connected to an external network based on a wireless communication protocol such as wireless fidelity (WiFi), Institute of Electrical and Electronics Engineers (IEEE), or the like. The communication interface 120 may also be referred to as a communication unit, a communication module, a transceiver, or the like.

The processor 130 may be electrically connected to the memory 110 and control overall operations and functions of the electronic device 100. For example, the processor 130 may drive an operating system or an application program to control hardware or software components connected to the processor 130, and perform various kinds of data processing and calculation. In addition, the processor 130 may load and process commands (instructions) or data received from at least one of other components in the volatile memory, and store various data in the non-volatile memory.

To this end, the processor 130 may be implemented as a dedicated processor (for example, an embedded processor) for performing a corresponding operation or a general-purpose processor (for example, a central processing unit (CPU) or an application processor) capable of performing corresponding operations by executing one or more software programs stored in the memory device.

In the present disclosure, the processor may be at least one processor. Here, the at least one processor may be the general-purpose processor such as the central processing unit (CPU), the application processor (AP), a digital signal processor (DSP), or the like, a graphics-only processor such as a graphics processing unit (GPU) or a visual processing unit (VPU), or an artificial intelligence (AI)-only processor such as a neural processing unit (NPU).

The processor 130 may be implemented as a digital signal processor (DSP) that processes a digital signal, a microprocessor, or a time controller (TCON). However, the processor 130 is not limited thereto, and may include one or more of the central processing unit (CPU), a micro controller unit (MCU), a micro processing unit (MPU), a controller, the application processor (AP), the graphics-processing unit (GPU), a communication processor (CP) or an advanced RISC machines (arm) processor, or may be defined by these terms. In addition, the processor 130 may be implemented in a system-on-chip (SoC) or a large scale integration (LSI), in which a processing algorithm is embedded, or may be implemented in the form of a field programmable gate array (FPGA).

The processor 130 may be connected to the mesh network through the external device such as the first device 200. In detail, the processor 130 may receive a message related to provisioning from the first device 200 which is a provisioner through the communication interface 120, and may be connected to the mesh network while transmitting a response message thereto. A detailed description thereof is provided with reference to FIGS. 3 and 4 below.

The processor 130 may be connected to the mesh network, and then perform the provisioning operation so that another external device such as the second device 300 or the third device 400 that is not connected to the mesh network becomes a node in the mesh network.

Figure 4A:
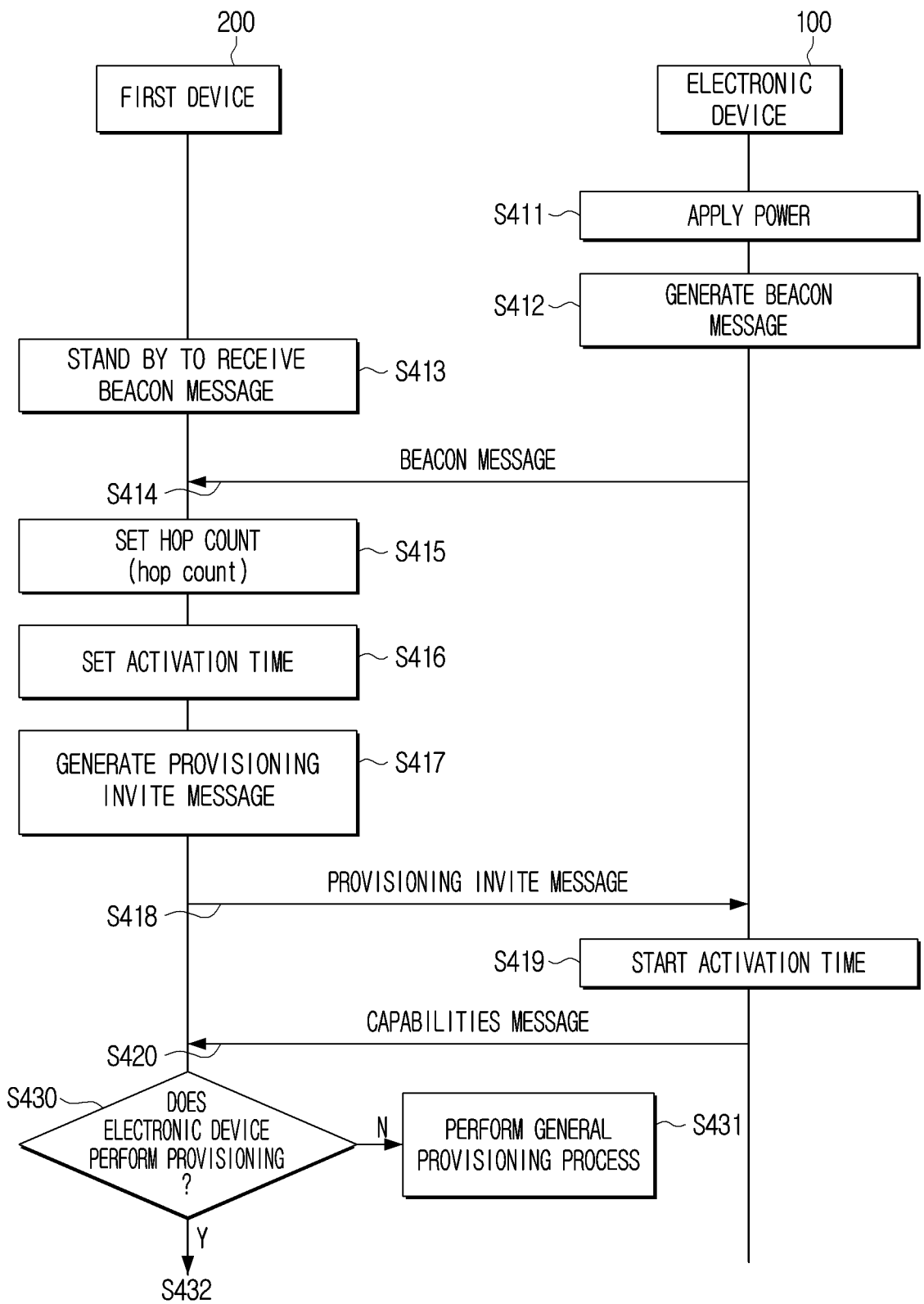

In this regard, FIG. 3 is a sequence diagram for explaining the electronic device that performs the provisioning according to another embodiment of the present disclosure; and FIGS. 4A and 4B are sequence diagrams showing the sequence diagram of FIG. 3 in more detail. FIG. 3 is described together with FIGS. 4A and 4B to avoid a redundant description.

Initially, the electronic device 100 is not connected to the mesh network. Power may be applied to the electronic device 100 (S411), and the processor 130 may then generate a beacon message (S412). Here, the beacon message refers to an advertising message including a message indicating that the electronic device 100 is not provisioned.

The processor 130 may control the communication interface 120 to broadcast the beacon message (S311 or S413).

The processor 130 may periodically broadcast the beacon message every preset time. Alternatively, the processor 130 may set a broadcast period of the beacon message in consideration of state information of the electronic device 100 such as battery information, and broadcast the beacon message based on a set period.

The processor 130 may control the communication interface 120 to transmit the beacon message to a plurality of external devices existing nearby the electronic device 100. In detail, the processor 130 may transmit the beacon message to the external device existing in a radio frequency (RF) coverage of the beacon message through the communication interface 120. Here, the communication interface 120 may communicate with the plurality of external devices existing nearby the electronic device 100 by using the Bluetooth method.

The electronic device 100 may exist in a signal reception range (or scan range) of the first device 200, and in this case, the first device 200 may receive the beacon message transmitted by the electronic device 100. To this end, the first device 200 may stand by to receive the beacon message (S413).

The first device 200 is an electronic device that is connected to the mesh network, and may perform the provisioning. That is, the first device 200 is an electronic device that connects a device that is not connected to the mesh network among the devices existing nearby the first device 200 to become a node in the mesh network.

The first device 200 may generate a provisioning invite message in response to the beacon message of the electronic device 100 (S417), and transmit the generated provisioning invite message to the electronic device 100 (S312 or S418). Here, the provisioning invite message refers to an invitation message for the first device 200 to connect the electronic device 100 to the mesh network.

Here, the first device 200 may generate and transmit the provisioning invite message including activation time of the electronic device 100. The activation time of the electronic device 100 refers to standby time for the electronic device 100 to perform the provisioning, and may include time when the electronic device 100 actively performs the provisioning.

To this end, the first device 200 may set a hop count when receiving the beacon message from the electronic device 100 (S415) and set the activation time based on the set hop count (S416). In the present disclosure, the hop count refers to the number of intermediate devices existing between the first device 200 and a destination device finally connected thereto in the mesh network. That is, the hop count refers to the maximum number of intermediate devices existing between the first device 200 and any device on the mesh network.

The first device 200 may set the hop count based on a size of the mesh network to be connected and the RF coverage of a node in the mesh network.

The first device 200 may then set the activation time based on the hop count. Here, the activation time may be set based on the hop count and attention duration of a node in the mesh network. Here, the attention duration refers to time when one node in the mesh network stands by for the provisioning. That is, the activation time may be proportional to the hop count in that the activation time may be calculated as a product of the hop count and the attention duration of a node in the mesh network.

When receiving the provisioning invite message from the first device 200, the processor 130 may start the activation time of the electronic device 100 based on activation time information included in the provisioning invite message (S419).

The processor 130 may transmit, to the second device 300, the network connection information until time in the activation time information elapses when receiving the activation time information from the first device 200.

After receiving the provisioning invite message from the first device 200, the processor 130 may transmit a capabilities message to the first device 200 (S313 or S420). The capabilities message may include the key information and information on an authentication means of the electronic device 100. The capabilities message may also include information indicating whether the electronic device 100 may perform the provisioning.

The first device 200 may transmit a provisioning start message to the electronic device 100 based on the capabilities message received from the electronic device 100 (S314).

In detail, the first device 200 may determine whether the electronic device 100 may perform the provisioning based on the capabilities message (S430).

When determining that the electronic device 100 is unable to perform the provisioning (S430-N), the first device 200 may perform a conventional general provisioning process (S431). In this case, the first device 200 may transmit the provisioning start message to the electronic device 100 by using the key information and the authentication means, included in the capabilities message, and perform authentication with the electronic device 100, thereby transmitting the network connection information including security information. The electronic device 100 may then transmit a provisioning complete message to the first device 200 so that the first device 200 ends the provisioning for the electronic device 100.

On the other hand, when determining that the electronic device 100 may perform the provisioning (S430-Y), the first device 200 may generate the provisioning start message (S432). The first device 200 may then transmit the provisioning start message to the electronic device 100 by using the key information and the authentication means, included in the capabilities message (S433).

The provisioning start message may be transmitted (S433), and key exchange and the authentication between the electronic device 100 and the first device 200 may then be performed (S315). In detail, the electronic device 100 and the first device 200 may exchange each other's public keys directly or out-of-band, and authenticate each other by using the exchanged public keys. A conventional technical method is used as the key exchange and authentication method in the present disclosure, and a detailed description thereof is omitted.

After completing the authentication, the first device 200 may generate the network connection information including the hop count (S434) and transmit the generated network connection information to the electronic device 100 (S316 or S435). Here, the network connection information may include not only the hop count but also provisioning activate information indicating that an external device nearby (e.g., within a scan range of) the electronic device 100 is required to be operated as a node that provides network information. For example, the network connection information transmitted by the first device 200 may include the provisioning information indicating that the electronic device 100 is required to be operated as the node that provides the network information.

When receiving the network connection information including the provisioning activate information and hop count information, the processor 130 may perform the provisioning (S320).

In detail, the processor 130 may switch the electronic device 100 to a provisioning activate mode (S436). Here, the processor 130 may reset the hop count and the activation time, included in the hop count information received from the first device (S437). In detail, the processor 130 may update the network connection information by decreasing the hop count included in the network connection information received from the first device 200, and store the same in the memory 110. The processor 130 may then reset the activation time based on the reduced hop count.

Here, the processor 130 may control the electronic device 100 to stand by to receive a beacon signal (also referred to as a beacon message) from the nearby external device (S438).

The processor 130 may receive the beacon message from the nearby external device such as the second device 300 (S321). Here, the second device 300 may be a device that is not connected to the mesh network, and the beacon message transmitted by the second device 300 may include information indicating that the second device 300 is an un-provisioned device.

When receiving the beacon message from the second device 300 (S439-Y), the processor 130 may perform the provisioning with the second device 300 (S440). In detail, the processor 130 may transmit the updated network connection information to the second device 300 by using the communication interface 120 to connect the second device 300 to the network.

In more detail, the processor 130 may transmit the provisioning invite message to the second device 300 (S322). Here, the processor 130 may reset the activation time received from the first device 200, and transmit the provisioning invite message including the reset activation time to the second device 300.

The processor 130 may perform the provisioning with the second device 300 until the provisioning complete message is received from the first device 200. Accordingly, the processor 130 may transmit, to the second device 300, the activation time information reset in step S437, that is, the activation time information having activation time having time less than the time in the activation time information received from the first device 200.

The second device 300 may start the activation time based on the received activation time information, and transmit/receive a message related to the provisioning with the electronic device 100 while standing by for the provisioning with the electronic device 100 during the activation time.

In detail, the second device 300 may transmit, to the electronic device 100, the capabilities message including the information such as the key information and information on authentication means or the like of the second device 300. As in the case of the electronic device 100, the capabilities message transmitted from the second device 300 may include information indicating whether the second device 300 may perform the provisioning.

The processor 130 may transmit the provisioning start message to the second device 300 (S324). The processor 130 may transmit the provisioning start message to the second device 300 by using the key information and the authentication means, included in the capabilities message received from the second device 300.

The key exchange and the authentication may then be performed between the electronic device 100 and the second device 300 (S326). A description thereof is the same as that of the above-described step S315, and a detailed description thereof is omitted.

The processor 130 may transmit the updated network connection information to the second device 300 (S325). In detail, the processor 130 may update the network connection information by decreasing the hop count included in the network connection information received from the first device 200 by one, and transmit the updated network connection information to the second device 300.

Meanwhile, in some embodiments, the processor 130 may determine the network connection information to be transmitted to the second device 300 based on the hop count included in the network connection information received from the first device 200.

In detail, the processor 130 may determine whether to transmit the network connection information including the provisioning activate information to the second device 300 based on the hop count received from the first device 200 in that the hop count received from the first device 200 refers to the number of intermediate devices existing between the first device 200 and any device connected thereto in the mesh network. Here, the provisioning activate information refers to the information indicating that the second device 300 is required to be operated as the node that provides the network information to an external device nearby the second device 300.

The processor 130 may transmit, to the second device 300, the network connection information including the provisioning activate information when the hop count received from the first device 200 is greater than or equal to a preset value. For example, the hop counts received from the first device 200 may be two or more when there are two or more intermediate devices existing between the first device 200 and any device connected thereto. In this case, the processor 130 may transmit, to the second device 300, the network connection information including the provisioning activate information.

Here, the processor 130 may transmit, to the second device 300, the network connection information including the hop count information decreased by one and the provisioning activate information.

However, the hop count received from the first device 200 may be less than the preset value. In this case, the processor 130 may transmit, to the second device 300, the network connection information including no provisioning activate information or may not transmit the network connection information at all. For example, the hop count received from the first device 200 may be one. In this case, the second device 300 does not need to perform the provisioning even when receiving the network connection information from the processor 130 and becoming a node in the mesh network in that the number of intermediate devices connected to the first device 200 is one (that is, only the electronic device 100 is the intermediate device). Accordingly, the processor 130 may transmit, to the second device 300, the network connection information including no provisioning activate information. Meanwhile, the hop count received from the first device 200 may be zero. In this case, the processor 130 may not transmit the network connection information to the second device 300 in that the electronic device 100 is the last node connected to the first device 200 in the mesh network.

The second device 300 may notify the electronic device 100 that the provisioning operation is completed when the time in the activation time information received from the electronic device 100 elapses.

When receiving a provisioning complete signal from the second device 300 (S327), the processor 130 may end the provisioning operation with the second device 300.

Meanwhile, the processor 130 may determine whether the activation time of the electronic device 100 received from the first device 200 ends (S441). The activation time may not end (S441-N). In this case, the processor 130 may control the electronic device 100 to stand by to receive the beacon signal from another external device (e.g., third device).

The activation time may end (S441-Y). That is, the time in the activation time information received from the first device 200 may elapse. In this case, the processor 130 may notify the first device 200 connected to the network that the provisioning operation is completed by using the communication interface 120. In detail, the processor 130 may transmit the provisioning complete signal to the first device 200 (S317 or S442). The processor 130 may then end the provisioning activate mode (S328 or S443).

Meanwhile, the first device 200 may determine whether the provisioning-activation time of the first device ends (S444). The provisioning-activation time of the first device may end (S444-Y), and in this case, the first device 200 may end the provisioning (S445). On the other hand, the provisioning-activation time of the first device may not end (S444-N), and in this case, the first device 200 may stand by to receive the beacon signal of a nearby device (S413).

As such, the electronic device 100 provisioned from the first device 200 may perform the provisioning operation with the second device 300, and the first device 200 may allow the second device 300 to be connected to the mesh network even when not performing the provisioning operation with the second device 300.

Figure 5:
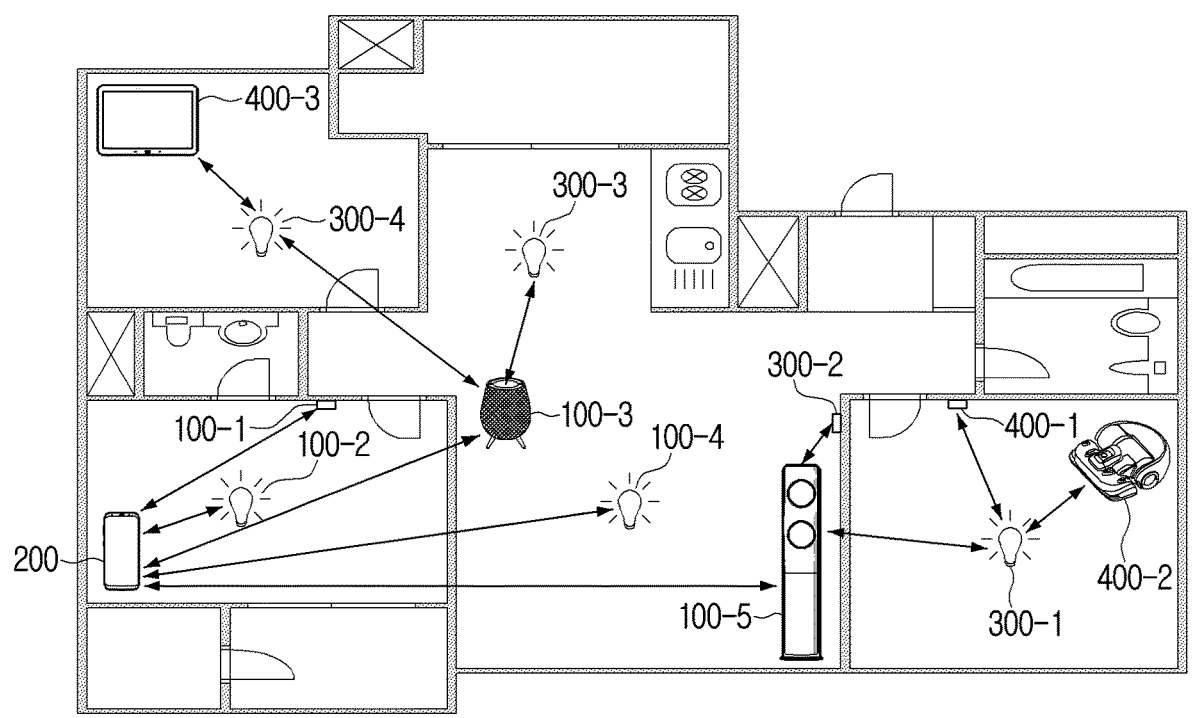
FIG. 5 is a view of a state of the electronic device after the provisioning is completed according to another embodiment of the present disclosure.

FIG. 5 is a view for explaining a state of the electronic device after the provisioning is completed according to another embodiment of the present disclosure. In detail, FIG. 5 is a plan view of a space including a plurality of electronic devices.

The first device 200 (e.g., smart phone) may perform the provisioning so that a switch 100-1, a lighting device 100-2, a speaker 100-3, a lighting device 100-4, and an air conditioner 100-5, existing in the scan range of the first device 200, become nodes of the mesh network. The switch 100-1, the lighting device 100-2, the speaker 100-3, the lighting device 100-4, and the air conditioner 100-5 may each correspond to the electronic device 100 of FIGS. 3 and 4 in that these devices are connected to the mesh network through the provisioning of the first device 200.

Meanwhile, the beacon messages broadcasted by the lighting device 300-1 and the switch 300-2 may not be detected in the scan range of the first device 200, and in this case, the first device 200 may not perform the provisioning with the lighting device 300-1 or the switch 300-2.

However, the air conditioner 100-5 received the network connection information from the first device 200 and may perform the provisioning operation, and the hop count included in the network connection information received by the air conditioner 100-5 from the first device 200 may be greater than or equal to the preset value. In this case, the air conditioner 100-5 may perform the provisioning so that the lighting device 300-1 and the switch 300-2 are included in the mesh network. Here, the lighting device 300-1 and the switch 300-2 may each correspond to the second device 300 of FIGS. 3 and 4 in that these devices are provisioned through the device provisioned by the first device 200.

Meanwhile, a switch 400-1 and a robot cleaner 400-2 may also exist in a scan range of the air conditioner 100-5, and in this case, the air conditioner 100-5 may transmit the provisioning invite message to the switch 400-1 and the robot cleaner 400-2. Here, the lighting device 300-1 connected to the mesh network through the air conditioner 100-5 may perform the provisioning operation, and in this case, the lighting device 300-1 may also transmit the provisioning invite message to the switch 400-1 and the robot cleaner 400-2.

That is, in some embodiments, one electronic device included in the space may receive a plurality of provisioning invite messages from the plurality of the nearby devices already within the mesh network. In this case, the electronic device may respond to one invitation message among the plurality of provisioning invite messages in consideration of a signal strength of the provisioning invite message, arrival time of the signal, the activation time information included in the provisioning invite message, or the like. In detail, the electronic device may select one message from the plurality of received provisioning invite messages, and transmit the capabilities message in response to the selected provisioning invite message.

For example, the switch 400-1 and the robot cleaner 400-2 may each receive the provisioning invite message from the air conditioner 100-5 or the lighting device 300-1. In this case, the switch 400-1 and the robot cleaner 400-2 may each respond to the provisioning invite message transmitted from the lighting device 300-1 in consideration of the signal strength of the provisioning invite message, the arrival time of the signal, the activation time information included in the provisioning invite message, or the like, transmitted from the lighting device 300-1 or the air conditioner 100-5.

The switch 400-1 and the robot cleaner 400-2 may then each be connected to the mesh network through the lighting device 300-1. However, this configuration is only an example, and the switch 400-1 and the robot cleaner 400-2 may each respond to the provisioning invite message transmitted from the air conditioner 100-5, and connected to the provisioning network through the air conditioner 100-5.

Similarly, the speaker 100-3 may receive each beacon message broadcasted by the lighting devices 300-3 and 300-4, and transmit the provisioning invite message to the lighting devices 300-3 and 300-4. Here, the lighting device 100-2 may also transmit the provisioning invite message to the lighting device 300-4. That is, the lighting device 300-4 may receive each signal broadcasted by the lighting device 100-2 and the speaker 100-3 based on each scan range of the lighting device 100-2 and the speaker 100-3. However, the lighting device 300-4 may respond to the provisioning invite message transmitted from the speaker 100-3 in consideration of the signal strength, the arrival time of the signal, and the activation time information included in the provisioning invite message, and then connected to the mesh network through the provisioning of the speaker 100-3.

In addition, the lighting device 300-4 may perform the provisioning, and the hop count included in the connection information received by the lighting device 300-4 may be greater than or equal to the preset value. In this case, the lighting device 300-4 may perform the provisioning with a tablet PC 400-3 by receiving the beacon message broadcasted by the tablet PC.

Meanwhile, the electronic device 100 may receive a control command for another external device from an external device in the mesh network indicating that the plurality of devices included in the space are connected to each other in one mash network through the provisioning. In detail, the processor 130 may also receive the control command for the second device 300 from the first device.

The processor 130 may provide the second device 300 with a received control command when receiving the control command for the second device 300 from the first device 200. For example, the electronic device 100 may be the air conditioner 100-5 and the electronic device 100 may receive the control command for the robot cleaner 400-2 from the smartphone. In this case, the processor 130 may provide the control command transmitted from the smartphone to the robot cleaner 400-2 through the lighting device 300-1.

As such, the plurality of devices may be connected to one network through the provisioning, and in this case, the electronic device 100 may more efficiently control another electronic device through the network.

FIGS. 6A, 6B and 6C are views for explaining a message transmitted and received in a provisioning process according to another embodiment of the present disclosure.

The electronic device 100, the first device 200, and the second device 300, according to another embodiment in the present disclosure, may perform the communication by using the Bluetooth method or the Bluetooth low energy communication method. That is, the communication interface 120 according to the present disclosure may communicate with the first device 200 and the second device 300 by using the Bluetooth communication method or the Bluetooth low energy communication method. Here, the electronic device 100, the first device 200, and the second device 300 may transmit/receive the message based on a standard base of a Bluetooth special interest group (SIG).

In this regard, FIG. 6A shows the provisioning invite message, FIG. 6B shows the capabilities message, and FIG. 6C shows the connection information including the provisioning activate information and the hop count.

FIG. 6A shows an attention duration field of the provisioning invite message including the activation time information.

As shown in FIG. 6A, in Bluetooth standard technology, the attention duration field of the provisioning invite message has a size of one byte and is used to inform that a provisioning target node maintains a specific operation state.

In some embodiments of the present disclosure, the activation time information may be included in a preset area of the one-byte provisioning invite message when the electronic device 100 performs the provisioning.

In detail, the electronic device 100 may perform the provisioning, and in this case, the provisioning invite message may be transmitted by setting one (1) as the first value (0x00) of the attention duration field of the message, and setting the activation time information as the remaining 7 bit values. Here, the activation time information indicates the time a provisioning target device needs to stand by for the provisioning.

FIG. 6B shows bitmap information of an algorithms field included in the capabilities message. The algorithms field may have a size of two (2) bytes in the Bluetooth standard technology, and the processor 130 may indicate whether the electronic device 100 may perform the provisioning operation by using an unused bit in the algorithms field.

For example, whether or not the electronic device 100 may perform the provisioning operation may be set in an area corresponding to a second bit of the two (2)-byte algorithms field, and in this case, the processor 130 may generate the bitmap information as shown in FIG. 6B.

FIG. 6C shows bitmap information of a flags field for indicating a security key update method among information included in the network connection information. The flags field may have a size of one (1) byte in the Bluetooth standard technology. As in FIG. 6B, the processor 130 may use an unused bit area in the flags fields to provide a flag (e.g., proactive) for the provisioning activate information (e.g., provisioning flag) and the hop count information.

For example, the flag for the provisioning activate information may be set in the third bit area of the one-byte flags field and the hop count information may be set in the 4th to 7th bit areas, and in this case, the processor 130 may generate the bitmap information as shown in FIG. 6C.

Figure 7:
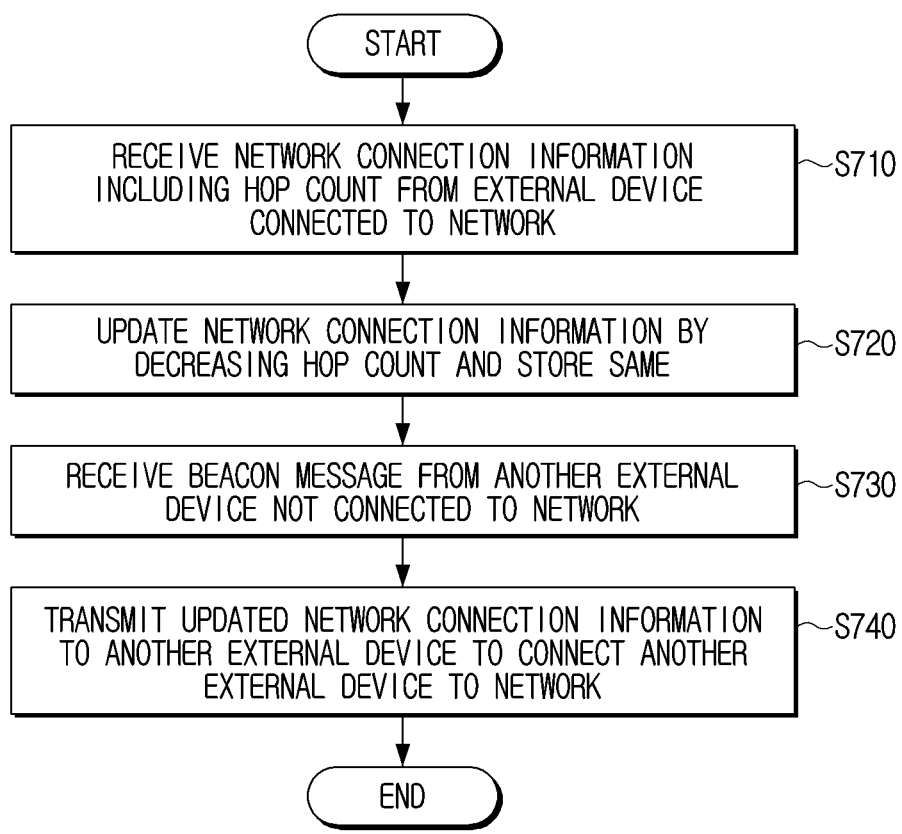
FIG. 7 is a flowchart showing a control method of an electronic device according to still another embodiment of the present disclosure.

FIG. 7 is a flowchart showing a control method of an electronic device according to still another embodiment of the present disclosure.

First, the electronic device 100 may transmit a beacon message that is an advertising message including a message indicating that an electronic device 100 is not provisioned to a nearby device.

The electronic device 100 may then receive a provisioning invite message from a first device 200 in response to the beacon message. Here, the provisioning invite message may include activation time information of the electronic device 100. When receiving the activation time information from the first device 200, the electronic device 100 may transmit network connection information to a second device 300 until time in the activation time information elapses.

The electronic device 100 may transmit a capabilities message including security information and information on whether the electronic device may perform a provisioning operation.

The electronic device 100 may then receive the network connection information including a hop count from the first device 200 connected to a network (S710).

The electronic device 100 may be changed to a provisioning activate mode when receiving the network connection information.

The electronic device 100 may then update the network connection information by decreasing the hop count and store the same when receiving the network connection information including the hop count from the first device 200 connected to the network (S720). Here, the electronic device 100 may update the network connection information by decreasing the hop count received from the first device 200 by one, and store the same.

The electronic device 100 may receive the beacon message from the second device 300 that is not connected to the network (S730). Here, the beacon message transmitted from the second device 300 may include information indicating that the second device 300 is a device that is not included in the mesh network.

The electronic device 100 may transmit the updated network connection information to the second device 300 to connect the second device to the network (S740).

In detail, the electronic device 100 may transmit, to the second device 300, the provisioning invite message including updated activation time information. Here, the electronic device 100 may transmit, to the second device 300, the activation time information having time less than time in the activation time information received from the first device 200 in that the activation time included in the activation time information is proportional to the hop count, and the electronic device 100 updates the hop count received from the first device 200.

Meanwhile, the electronic device 100 may communicate with the first device 200 and the second device 300 by using a Bluetooth communication method or a Bluetooth low energy communication method. In this case, the provisioning invite message may have a preset size based on a standard base of a Bluetooth special interest group (SIG). Here, the activation time information may be information included in a preset area in the provisioning invite message.

As in the electronic device 100, the second device 300 may transmit, to the electronic device 100, the capabilities message including whether the second device 300 may perform the provisioning operation. The second device 300 may perform the provisioning operation, and in this case, the network connection information transmitted by the electronic device 100 to the second device 300 may include provisioning activate information indicating that a nearby external device needs to be operated as a node that provides network information.

In some embodiments, the hop count in the network connection information received from the first device 200 may be greater than or equal to a preset value, and in this case, the electronic device 100 may transmit, to the second device 300, the network connection information including the provisioning activate information.

The electronic device 100 may transmit the network connection information to the second device 300 until the time in the activation time information received from the first device 200 elapses.

The electronic device 100 may then notify the first device 200 connected to the network that the provisioning operation is completed when the time in the activation time information elapses. The first device 200 that receives a provisioning operation-completion message from the electronic device 100 may end the provisioning.

In this way, the electronic device 100 that is connected to the mesh network through the provisioning operation of the first device 200 may perform the provisioning operation with the second device 300 that is another device located nearby, and the first device 200 may thus efficiently connect other devices to the mesh network.

As such, the first device 200 may control other devices through the electronic device 100 when the plurality of devices are connected to one network. For example, the electronic device 100 may receive a control command for the second device 300 from the first device 200 in the mesh network in which the plurality of devices, including the first device 200, the electronic device 100, and the second device 300, are connected to each other. In this case, the electronic device 100 may control the second device 300 by transmitting the received control command to the second device 300.

As such, the electronic device 100 or the various operations described as being performed through the electronic device 100 may be performed through one or more electronic devices by using the control method or operation method of an electronic device.

Through the above-described process, the plurality of electronic devices 100, 200, 300, and 400 included in a network system 1000 may form the mesh network. Hereinafter, the description describes a process in which the network system 1000 identifies locations of the plurality of electronic devices 100, 200, 300, and 400 that form the mesh network. The network system 1000 may include the plurality of electronic devices 100, 200, 300 and 400, and a server 800. Alternatively, the network system 1000 may further include a terminal device 900.

The electronic device 100 may form the mesh network with an external electronic device through the above-described process. A processor 130 of the electronic device 100 that forms the mesh network may control a communication interface 120 to obtain a received signal strength indicator (RSSI) of at least one external electronic device located nearby. For example, the electronic device 100 may obtain the RSSI of each of the first device 200, the second device 300, and the third device 400. The processor 130 may then generate an RSSI table based on the obtained RSSI. A memory 110 may store the generated RSSI table. Alternatively, for another example, the memory 110 may store an RSSI signal processing module, a Bluetooth signal processing module, identification information of the electronic device, or the like.

The Bluetooth signal processing module may receive a Bluetooth signal, manage a Bluetooth-related network, and transmit the advertising message or a control message. The advertising message may include a timer therein and may be periodically transmitted to a nearby electronic device. Meanwhile, the Bluetooth signal processing module may transmit the identification information of the electronic device together when transmitting the advertising message. For example, the identification information may include the name, serial number, identification (ID), location on a grid, or the like of the electronic device. The grid may refer to data including virtual horizontal lines and vertical lines to arrange the locations of the plurality of electronic devices 100, 200, 300, and 400. The RSSI signal processing module may process the RSSI signal when receiving the advertising message from the nearby electronic device. The processor 130 may load the module or data stored in the memory 110 to perform a related operation.

The processor 130 may control the communication interface 120 to transmit the generated RSSI table to the server 800. The first device 200, the second device 300, and the third device 400 may each perform the process of obtaining the RSSI of the nearby device, generating the RSSI table, and transmitting the generated RSSI table to the server 800.

Figure 8:
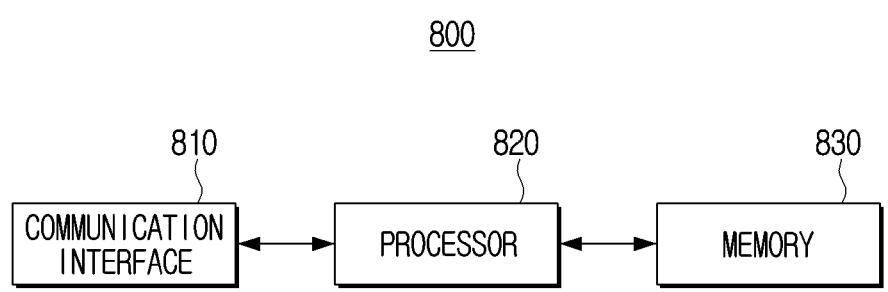
FIG. 8 is a block diagram showing a configuration of a server according to an embodiment of the present disclosure.

FIG. 8 is a block diagram showing a configuration of the server according to an embodiment of the present disclosure.

Referring to FIG. 8, the server 800 may include a communication interface 810, a processor 820, and a memory 830.

The communication interface 810 may communicate with each of the plurality of electronic devices 100, 200, 300, and 400. The communication interface 810 may receive a received signal strength indicator (RSSI) table generated by each of the plurality of electronic devices 100, 200, 300, and 400.

For example, the communication interface 810 may be a module that communicates with the plurality of electronic devices 100, 200, 300, and 400 by being connected to an external network based on a wireless communication protocol such as long term evolution (LTE), 5th-generation (5G), wireless fidelity (WiFi), Bluetooth (BT), Bluetooth low energy (BLE), ZigBee, Institute of Electrical and Electronics Engineers (IEEE) or the like. The communication interface 810 that communicates with the plurality of electronic devices 100, 200, 300 and 400 may also be referred to as a communication unit, a communication module, a transceiver, or the like.

The memory 830 may store an operating system, instructions, or data for controlling overall operations of components included in the server 800. In addition, the memory 830 may store the RSSI table received from each of the plurality of electronic devices 100, 200, 300 and 400. Meanwhile, the memory 830 may also store the identification information and grid data of the plurality of electronic devices 100, 200, 300 and 400. For example, the memory 830 may be implemented as a non-volatile memory, a volatile memory, a flash memory, a hard disk drive (HDD), a solid state drive (SDD), or the like.

The processor 820 may perform operations according to the various embodiments by executing the instruction stored in the memory 830. The processor 820 may convert an RSSI included in the RSSI table into a distance. For example, the electronic device may be a fixed device. In this case, the processor 820 may convert the RSSI into a distance based on a fixed-distance value and an average value of the RSSI of each of the plurality of electronic devices 100, 200, 300, and 400. Alternatively, the processor 820 may convert the RSSI into a distance based on a change value of the RSSI on the basis of a distance. For example, two (2) may be the RSSI of the first device 200, measured by the electronic device 100, and one (1) may be the RSSI of the second device 300. In this case, a distance between the electronic device 100 and the second device 300 may be approximately two times greater than a distance between the electronic device 100 and the first device 200. For example, the processor 820 may convert the RSSI into a distance based on an RSSI-to-distance table (or a footprint).

The processor 820 may obtain relative location information of the plurality of electronic devices 100, 200, 300, and 400 based on the converted distance. Meanwhile, the processor 820 may perform triangulation on three electronic devices among the plurality of electronic devices 100, 200, 300, and 400 based on the converted distances between the three electronic devices. The processor 820 may obtain the relative location information of the plurality of electronic devices 100, 200, 300, and 400 based on the converted distance and result information of the performed triangulation. Meanwhile, the server 800 and the plurality of electronic devices 100, 200, 300 and 400 may be connected with one another through a gateway (not shown). The gateway may include a triangulation module to perform a triangulation process when the network system 1000 includes the gateway. That is, the gateway may also perform the triangulation process when the network system 1000 includes the gateway.

The processor 820 may arrange the locations of the plurality of electronic devices 100, 200, 300 and 400 based on the relative location information. The memory 830 may include the grid data, and in this case, the processor 820 may schematically arrange the plurality of electronic devices 100, 200, 300 and 400 based on the grid data, and adjust the locations of the plurality of electronic devices 100, 200, 300, and 400 based on the obtained relative location information, thereby arranging the locations of the plurality of electronic devices 100, 200, 300, and 400.

Meanwhile, the server 800 may further include a display (not shown). The server 800 may display arrangement information through the display.

A terminal device 900 may be included in the network system 1000, and in this case, the processor 820 may control the communication interface 810 to transmit, to the terminal device 900, the arrangement information on the arranged locations of the plurality of electronic devices 100, 200, 300 and 400.

Figure 9:
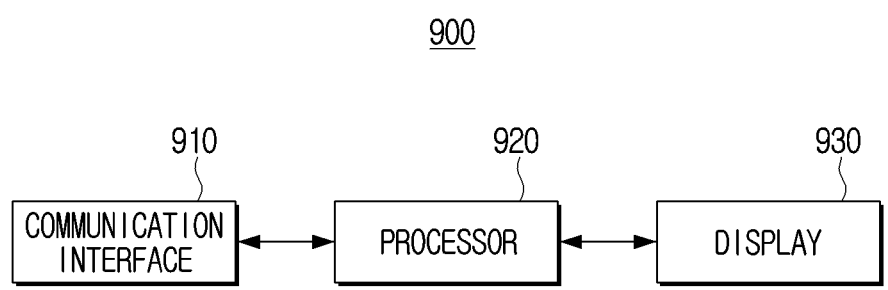
FIG. 9 is a block diagram showing a configuration of a terminal device according to an embodiment of the present disclosure.

FIG. 9 is a block diagram showing a configuration of the terminal device according to an embodiment of the present disclosure.

Referring to FIG. 9, the terminal device 900 may include a communication interface 910, a processor 920, and a display 930. For example, the terminal device 900 may include at least one of a smartphone, a tablet PC, an e-book reader, a desktop PC, a laptop PC, a netbook computer, a workstation, a server, a PDA, a portable multimedia player (PMP), an MP3 player, a medical device, a camera, or a wearable device.

The communication interface 910 may receive, from the server 800, the arrangement information in which the plurality of electronic devices 100, 200, 300 and 400 are arranged based on a relative distance. For example, the communication interface 810 may be a module that communicates with the server 800 by being connected to an external network based on a wireless communication protocol such as long term evolution (LTE), 5th-generation (5G), wireless fidelity (WiFi), Bluetooth (BT), Bluetooth low energy (BLE), ZigBee, Institute of Electrical and Electronics Engineers (IEEE) or the like. The communication interface 910 may also be referred to as a communication unit, a communication module, a transceiver, or the like.

The processor 920 may control the display 930 to display the arrangement information. Meanwhile, the processor 920 may control the display 930 to display data on an area where the plurality of electronic devices 100, 200, 300 and 400 are located together with the arrangement information. For example, the data on the area where the plurality of electronic devices 100, 200, 300 and 400 are located may include a map, a photo, a floor plan inside a building, or the like.

The display 930 may display the received arrangement information under control of the processor 920. In addition, the display 930 may display the data on the area where the plurality of electronic devices 100, 200, 300 and 400 are located. For example, the display 180 may be implemented as a liquid crystal display (LCD), an organic light emitting diode (OLED), a flexible display, a touch screen, or the like.

Meanwhile, the terminal device 900 may further include an input interface (not shown). The input interface may receive, from a user, a control command for moving the locations of the arranged plurality of electronic devices 100, 200, 300 and 400. For example, the input interface 160 may be implemented as a keyboard, a key pad, a touch pad, a touch screen, or the like. The input interface may also be referred to as an input unit, an input module, or the like.

Hereinafter, the description describes a specific method for obtaining and arranging the relative location information of the plurality of electronic devices.

Figure 10A:
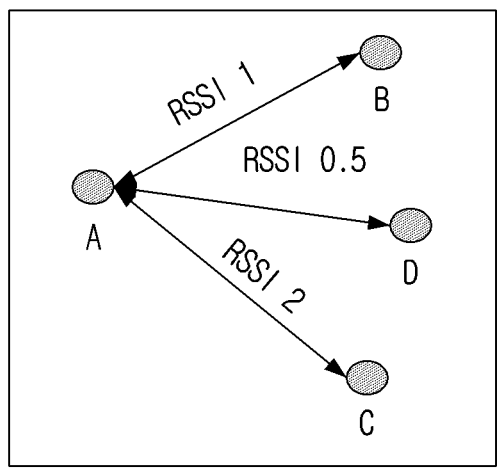
FIG. 10A is a view of a measurement process of a received signal strength indicator (RSSI) according to an embodiment of the present disclosure.
Figure 10B:
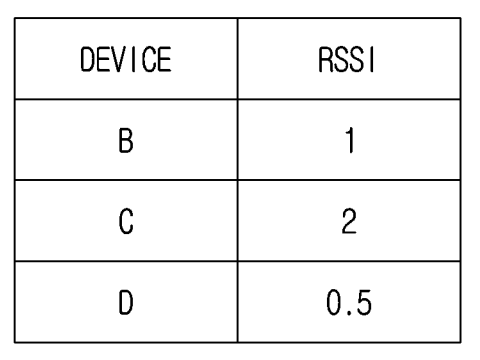
Figure 10C:
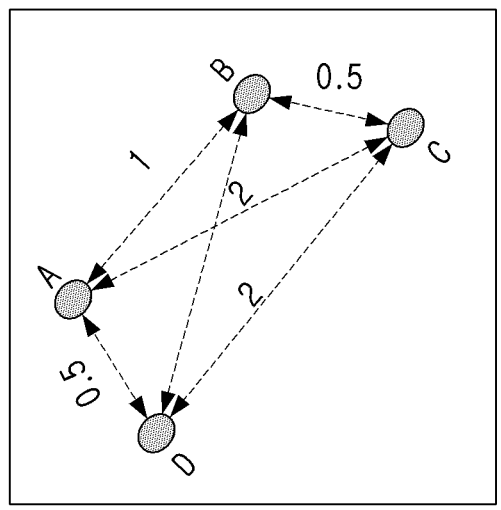
FIG. 10C is a view showing an RSSI-based relative distance according to an embodiment of the present disclosure.
Figure 10D:
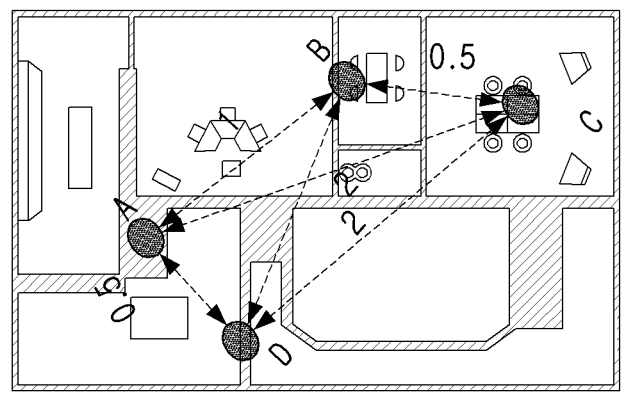
FIG. 10D is a view showing electronic devices arranged based on the obtained relative distance according to an embodiment of the present disclosure.
Figure 10E:
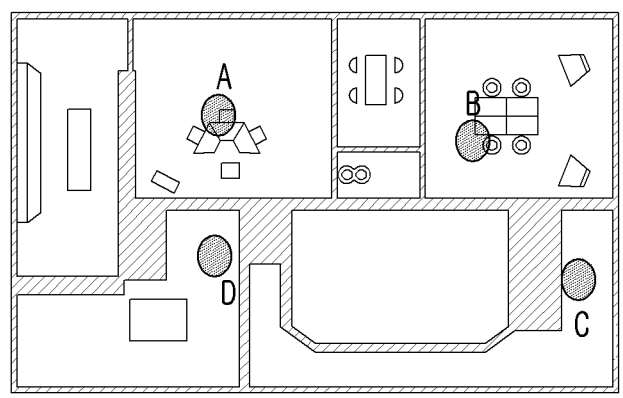
FIG. 10E is a view showing the electronic devices whose locations are adjusted according to an embodiment of the present disclosure.

FIG. 10A is a view for explaining a measurement process of the received signal strength indicator (RSSI) according to an embodiment of the present disclosure;

FIG. 10B is a view showing a measurement result of the RSSI according to an embodiment of the present disclosure; FIG. 10C is a view showing an RSSI-based relative distance according to an embodiment of the present disclosure; FIG. 10D is a view showing electronic devices arranged based on the obtained relative distance according to an embodiment of the present disclosure; and FIG. 10E is a view showing the electronic devices whose locations are adjusted according to an embodiment of the present disclosure. The description is provided with reference to FIGS. 10A to 10E.

FIG. 10A shows an electronic device A, an electronic device B, an electronic device C, and an electronic device D. The electronic devices A to D may form the mesh network. The electronic devices B to D may periodically transmit the advertising messages and the identification information. The electronic device A may measure the RSSI of each electronic device when receiving the advertising message from each of the electronic devices B to D. The electronic device A may generate the RSSI table and store the RSSI measured in correspondence with each electronic device. FIG. 10B shows an example of the RSSI table stored by the electronic device A. The electronic devices B to D may measure the RSSI of each nearby electronic device in the same manner, and store the RSSI table. Each electronic device may transmit the stored RSSI table to the server. Each electronic device may also transmit the identification information to the server.

The server may store the RSSI table together with the received identification information. The server may then obtain the relative location information of each electronic device from the RSSI included in the RSSI table. The server may convert the RSSI into a distance. The server may then obtain the relative location information of each electronic device based on the converted distance. The server may arrange the locations of the respective electronic devices based on the obtained relative location information. FIG. 10C is an example showing the obtained relative location information and the locations of the devices arranged based on the relative location information.

Meanwhile, the server may store data on an area where the electronic devices A to D are located. The server may add arrangement information on the locations of the arranged electronic devices to data on the area where the electronic devices are located. FIG. 10D shows an example of the arrangement information added to the area data. The server may adjust the arranged locations of the electronic devices based on the data on the area where the electronic devices are located. For example, the area where the electronic devices are located may be inside a building. In addition, as shown in FIG. 10D, the area data may not match the electronic devices arranged based on the relative location information. Accordingly, as shown in FIG. 10E, the server may identify the data on the area where the electronic devices are located, and may adjust the locations of initially-arranged electronic devices based on the identified area data. The server may display the data on the area where the electronic devices are located, including the display, and the adjusted arrangement information. Alternatively, the server may transmit, to the terminal device, the arrangement information in which the locations of the electronic devices are adjusted.

Meanwhile, the server may include the grid data. In addition, the server may arrange the electronic devices based on the grid data. An arrangement process of the electronic devices described in FIGS. 10A to 10E may be an arrangement process of the electronic devices located in a hop (or a radio frequency (RF) radius). The server may precisely arrange the locations of the electronic devices by using the grid data.

FIGS. 11A to 11D depict an arranging process of electronic devices based on grid data according to an embodiment of the present disclosure.

FIGS. 11A to 11D show a plurality of electronic devices 1-1 to 3-3. The server may store the identification information and grid data of each electronic device. The server may receive a RSSI table including an RSSI from each electronic device and store the same.

Figure 11A:
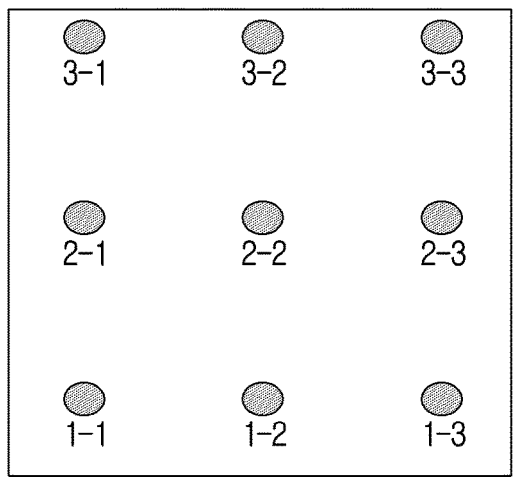
FIG. 11A is a view of an arranging process of electronic devices based on grid data according to an embodiment of the present disclosure.
Figure 11B:
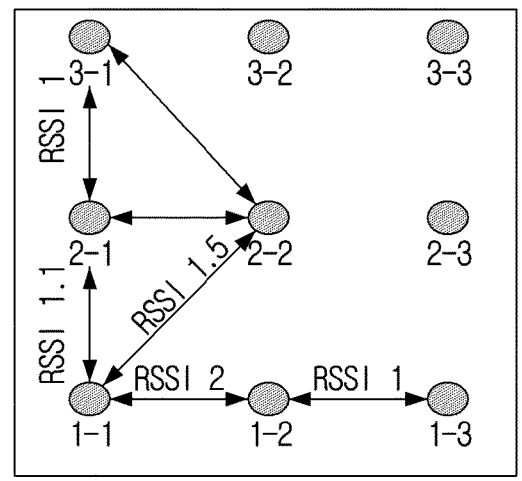
FIG. 11B is a view of an arranging process of electronic devices based on RSSI data according to an embodiment of the present disclosure.
Figure 11C:
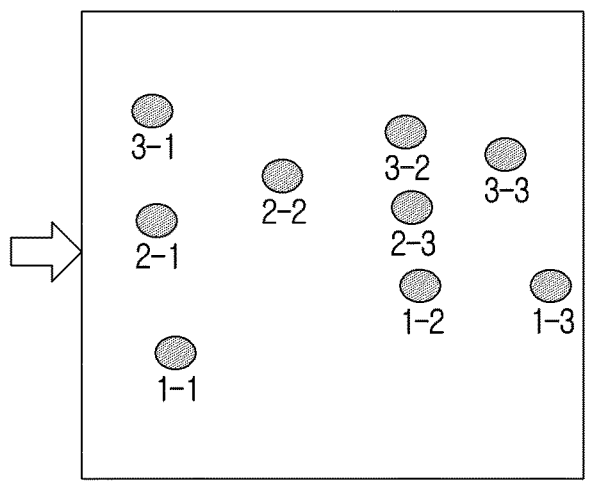
FIG. 11C is a view of an arranging process of electronic devices after rearranging devices based on obtained relative location information according to an embodiment of the present disclosure.

First, the server may arrange the electronic devices based on the grid data, as shown in FIG. 11A. The server may then obtain relative location information of each electronic device from the RSSI included in the RSSI table, as shown in FIG. 11B. The server may convert the RSSI into a distance. The server may then determine the relative location information of each electronic device based on the converted distance. The server may rearrange the locations of the respective electronic devices disposed on the grid data based on the obtained relative location information, as shown in FIG. 11C.

Figure 11D:
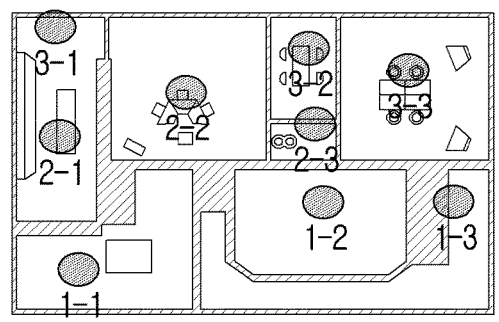
FIG. 11D is a view of an arranging process of electronic devices after a server adds arrangement information to the data based on the area where the electronic devices are located according to an embodiment of the present disclosure.

Meanwhile, the server may store data on an area where the plurality of electronic devices 1-1 to 3-3 are located. The server may add arrangement information including the arranged locations of the electronic devices to the data based on the area where the electronic devices are located, as shown in FIG. 11D. The server may adjust the arranged locations of the electronic devices based on the data on the area where the electronic devices are located. The server may display the data on the area where the electronic devices are located together with the adjusted arrangement information, or transmit the same to the terminal device.

FIG. 12 is a flowchart showing a control method of a system according to yet another embodiment of the present disclosure.

Referring to FIG. 12, an electronic device of the network system may update network connection information and store the same (S1210), receive a beacon message from another external electronic device (S1220), and transmit the updated network connection information to another external electronic device (S1230). The electronic devices may perform communication when network setting is completed. The above-described process is the same as that described with reference to FIG. 7, and a detailed description thereof is thus omitted.

The electronic device of the network system may generate a received signal strength indicator (RSSI) table by obtaining an RSSI of an external electronic device located nearby (S1240). For example, first to third devices may each transmit an advertising message. The first to third devices may each also transmit identification information together with the advertising message. The electronic device may measure the RSSI when receiving each advertising message transmitted by the first to third devices. That is, the electronic device may measure the RSSI of the first device when receiving the advertising message transmitted by the first device, the RSSI of the second device when receiving the advertising message transmitted by the second device, and the RSSI of the third device when receiving the advertising message transmitted by the third device. The electronic device may store the measured RSSI by generating the RSSI table together with the identification information of the device.

The electronic device may transmit the generated RSSI table to a server (S1250). The server may store the RSSI table received from each electronic device. The server may convert the RSSI included in the received RSSI table into a distance (S1260). The server may calculate relative location of each electronic device. For example, the server may convert the RSSI into a distance based on an RSSI-to-distance table (or a footprint).

The server may obtain relative location information of the electronic device and external electronic device, based on the converted distance (S1270). For example, the server may obtain the relative location information by performing triangulation between the electronic device and two external electronic devices located nearby based on the converted distance. The server may perform the triangulation for all the electronic devices. The server may store a triangulated value.

The server may arrange the locations of the electronic device and external electronic device based on the obtained relative location information (S1280). For example, the server may arrange the locations of the electronic device and external electronic device based on grid data and the obtained relative location information. If there is no grid data, the server may arrange the locations of the electronic device and external electronic device based on the obtained relative location information or the relative location information to which the triangulation value is applied. When there is the grid data, the server may dispose each electronic device based on the grid data, and apply the relative location information obtained based on the grid data to arrange the locations of the electronic devices. The server may adjust the arranged locations of the electronic devices based on data on an area where the electronic devices are located.

The server may display the location of each electronic device on a display based on arrangement information. Alternatively, the server may transmit the arrangement information to a terminal device. The terminal device may display the location of each electronic device based on the received arrangement information.

According to the present disclosure, it is possible to easily and quickly identify the location of the electronic device.

Meanwhile, the various embodiments of the present disclosure described above may be implemented in a computer or a computer readable recording medium using software, hardware, or a combination of software and hardware.

According to a hardware implementation, the embodiments described in the present disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units for performing other functions.

In some cases, the embodiments described in the present disclosure may be implemented by the processor itself. According to a software implementation, the embodiments such as procedures and functions described in the present disclosure may be implemented by separate software modules. Each of the software modules may perform one or more functions and operations described in the specification.

Meanwhile, computer instructions for performing processing operations of a user device or those of an administrator device according to the various embodiments of the present disclosure described above may be stored in a non-transitory computer-readable medium. The computer instructions stored in the non-transitory computer-readable medium allow the specific device described above to perform the processing operations of the user device and/or the administrator device according to the various embodiments described above when the instructions are executed by a processor of the specific device.

The non-transitory readable medium is not a medium that temporarily stores data, such as a register, a cache, a memory or the like, and indicates a medium that semi-permanently stores data and is readable by an apparatus. In detail, the various applications or programs described above may be stored and provided in the non-transitory computer-readable medium such as a compact disk (CD), a digital versatile disk (DVD), a hard disk, a Blu-ray disk, a universal serial bus (USB), a memory card, the read only memory (ROM) or the like.

In addition, although the embodiments are shown and described in the present disclosure as above, the present disclosure is not limited to the above mentioned specific embodiments, and may be variously modified by those skilled in the art to which the present disclosure pertains without departing from the gist of the present disclosure as claimed in the accompanying claims. These modifications should also be understood to fall within the scope and spirit of the present disclosure.

What is claimed is:

1. An electronic device comprising:
   a memory;
   a communication interface; and
   a processor configured to:
     update network connection information by decreasing a hop count and storing the decreased hop count in the memory in response to receiving the network connection information including the hop count from a first external electronic device connected to a network;
     transmit the updated network connection information to a second external electronic device by using the communication interface to connect the second external electronic device to the network when receiving a beacon message from the second external electronic device indicating that the second external electronic device is not connected to the network;
     generate a received signal strength indicator (RSSI) table by obtaining an RSSI of at least one external electronic device located within a scan range of the electronic device;
     transmit the generated RSSI table to a server by using the communication interface;
     receive, from the server by using the communication interface, arrangement information comprising the arranged locations of the electronic device, the first external electronic device and the second external electronic device; and
     display the arranged locations of the electronic device, the first external electronic device and the second external electronic device based on the received arrangement information.

2. The device of claim 1, wherein the network connection information includes provisioning activate information indicating that an external electronic device connected to the network is required to be operated as a node that provides network information; and
   the processor is configured to transmit, to the second external electronic device, the network connection information including the provisioning activate information when the hop count included in the received network connection information is greater than or equal to a preset value.

3. The device of claim 1, wherein the processor is configured to transmit, to the second external electronic device, the network connection information until a time in an activation time information elapses when receiving the activation time information from the first electronic device.

4. The device of claim 3, wherein the time in the activation time information is proportional to the hop count.

5. The device of claim 3, wherein the processor is configured to notify the first electronic device connected to the network that a provisioning operation is completed by using the communication interface when the time in the activation time information elapses.

6. The device of claim 1, wherein the processor is configured to:
   provide the second external electronic device with a received control command when receiving the control command for the second external electronic device from the first electronic device.

7. The device of claim 1, wherein the arrangement information comprises arrange locations of the electronic device, the first external electronic device and the second external electronic device based on relative location information by obtained converting the RSSI included in the RSSI table into a distance.

8. A control method of an electronic device, the method comprising:
   updating network connection information by decreasing a hop count and storing the updated hop count when the network connection information including the hop count is received from a first external electronic device connected to a network;
   receiving a beacon message from a second external electronic device that is not connected to the network;
   transmitting the updated network connection information to the second external electronic device to connect the second external electronic device to the network;
   generating a received signal strength indicator (RSSI) table by obtaining an RSSI of at least one external electronic device located within a scan range of the electronic device;
   transmitting the generated RSSI table to a server by using the communication interface;
   receiving arrangement information comprising the arranged locations of the electronic device, the first external electronic device and the second external electronic device; and
   displaying the arranged locations of the electronic device, the first external electronic device and the second external electronic device based on the received arrangement information.

9. The method of claim 8, wherein the network connection information includes provisioning activate information indicating that an external electronic device connected to the network is required to be operated as a node that provides network information, and wherein the transmitting includes transmitting, to the second external electronic device, the network connection information including the provisioning activate information when the hop count included in the received network connection information is greater than or equal to a preset value.

10. The method of claim 8, wherein the transmitting includes transmitting, to the second external electronic device, the network connection information until a time in an activation time information elapses when the activation time information is received from the first external electronic device.

11. The method of claim 10, wherein the time in the activation time information is proportional to the hop count.

12. The method of claim 10, further comprising notifying the first external electronic device connected to the network that a provisioning operation is completed when the time in the activation time information elapses.

13. An electronic device comprising:
   a memory;
   a communication interface; and
   a processor configured to:
      generate network connection information comprising a hop count and provisioning activation information indicating that an external device within a scan range of a device receiving the provisioning activation information is required to be operated as a node that provides network information;
      transmit the generated network connection information to another electronic device;
      receive, from the another electronic device, a provisioning complete signal;
      generate a received signal strength indicator (RSSI) table by obtaining an RSSI of at least one external electronic device located within a scan range of the electronic device;
      transmit the generated RSSI table to a server by using the communication interface;
      receive arrangement information comprising the arranged locations of the electronic device, the external device and the another electronic device; and
      display the arranged locations of the electronic device, the external device and the another electronic device based on the received arrangement information.

14. The device of claim 13, wherein the provisioning activate information is indicating that the electronic device connected to the network is required to be operated as a node that provides network information.

* * * * *